US011025645B2

(12) United States Patent
Lou et al.

(10) Patent No.: US 11,025,645 B2
(45) Date of Patent: Jun. 1, 2021

(54) DATA INTEGRITY PROTECTION METHOD AND APPARATUS

(71) Applicant: Huawei Technologies Co., Ltd., Shenzhen (CN)

(72) Inventors: Chong Lou, Shanghai (CN); Qufang Huang, Shanghai (CN); Xing Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/540,695

(22) Filed: Aug. 14, 2019

(65) Prior Publication Data

US 2019/0372995 A1 Dec. 5, 2019

Related U.S. Application Data

(63) Continuation of application No. PCT/CN2018/099916, filed on Aug. 10, 2018.

(30) Foreign Application Priority Data

Aug. 11, 2017 (CN) ........................ 201710686855.8

(51) Int. Cl.
*H04L 29/06* (2006.01)
*H04W 12/102* (2021.01)
*H04W 12/106* (2021.01)

(52) U.S. Cl.
CPC ........ *H04L 63/123* (2013.01); *H04L 63/0428* (2013.01); *H04W 12/102* (2021.01); *H04W 12/106* (2021.01)

(58) Field of Classification Search
None
See application file for complete search history.

(56) References Cited

U.S. PATENT DOCUMENTS 9,094,832 B2 * 7/2015 Yi ........................... H04L 69/04
9,232,404 B2 * 1/2016 Chen .................. H04L 63/1458
(Continued)

FOREIGN PATENT DOCUMENTS

CN 101001252 A 7/2007
CN 101860863 A 10/2010
(Continued)

OTHER PUBLICATIONS

Netmanias, Netmanias Technical Document: LTE Security II: NAS and AS Security, Oct. 14, 2014 (Year: 2014).*
(Continued)

*Primary Examiner* — Kambiz Zand
*Assistant Examiner* — Arezoo Sherkat
(74) *Attorney, Agent, or Firm* — Leydig, Voit & Mayer, Ltd.

(57) ABSTRACT

A data integrity protection method and apparatus in a network environment are described. A terminal device obtains an integrity protection algorithm and a key corresponding to a session or a flow, and a DRB corresponding to the session. The terminal device performs, by using the integrity protection algorithm and the key corresponding to the session, integrity protection on data of the DRB corresponding to the session or the flow, where one session includes a plurality of flows. Different integrity protection algorithms and keys can be used for different sessions, and different integrity protection algorithms and keys can also be used for different flows. In this way, integrity protection is more flexible and meets security requirements of a same user for different services.

19 Claims, 5 Drawing Sheets

Terminal device
Access network device
Core network device
S201. First message (to request to establish a session)
S202. Third message (to request to establish the session)
S203. Fourth message (an integrity protection algorithm and a key corresponding to a flow, and a DRB corresponding to the flow)
S204. Second message (a session identifier, a flow identifier, the integrity protection algorithm and the key corresponding to the flow, and the DRB corresponding to the flow)
S205. Store content of the second message

(56) References Cited

U.S. PATENT DOCUMENTS

| | | | | |
|---|---|---|---|---|
| 9,301,147 | B2 | 3/2016 | Zhang et al. | |
| 2005/0086477 | A1 | 4/2005 | Lin et al. | |
| 2012/0039471 | A1* | 2/2012 | Kim | H04W 12/02 380/270 |
| 2012/0289220 | A1* | 11/2012 | Yang | H04W 12/10 455/422.1 |
| 2012/0307709 | A1* | 12/2012 | Ostergaard | H04L 1/1685 370/315 |
| 2012/0315878 | A1 | 12/2012 | Deng | |
| 2013/0210384 | A1* | 8/2013 | Zhang | H04W 12/1006 455/410 |
| 2013/0236016 | A1* | 9/2013 | Zhang | H04W 12/10 380/270 |
| 2014/0362790 | A1 | 12/2014 | McCann | |
| 2015/0094073 | A1* | 4/2015 | Peng | H04W 72/0406 455/450 |
| 2015/0163678 | A1 | 6/2015 | Zhang et al. | |
| 2015/0358813 | A1* | 12/2015 | Lee | H04W 12/04 380/279 |
| 2016/0029213 | A1* | 1/2016 | Rajadurai | H04W 12/04 380/283 |
| 2017/0332312 | A1 | 11/2017 | Jung et al. | |
| 2018/0249479 | A1* | 8/2018 | Cho | H04W 12/0802 |
| 2018/0270668 | A1* | 9/2018 | Nair | H04L 63/205 |
| 2018/0368167 | A1* | 12/2018 | Kim | H04W 28/0278 |
| 2019/0029057 | A1* | 1/2019 | Pan | H04W 28/12 |
| 2019/0053098 | A1* | 2/2019 | Jo | H04W 80/08 |
| 2019/0075482 | A1* | 3/2019 | Eriksson | H04W 28/0263 |
| 2019/0349803 | A1* | 11/2019 | Byun | H04W 28/16 |
| 2019/0394651 | A1* | 12/2019 | Wifvesson | H04L 63/0428 |
| 2020/0178113 | A1* | 6/2020 | Jin | H04W 28/0268 |

FOREIGN PATENT DOCUMENTS

| | | | |
|---|---|---|---|
| CN | 102098676 | A | 6/2011 |
| CN | 102448058 | A | 5/2012 |
| CN | 102487507 | A | 6/2012 |
| CN | 102595390 | A | 7/2012 |
| CN | 105704753 | A | 6/2016 |
| CN | 107027117 | A | 8/2017 |
| WO | 2012055114 | A1 | 5/2012 |
| WO | 2016076628 | A2 | 5/2016 |
| WO | 2016159841 | A1 | 10/2016 |
| WO | 2016162502 | A1 | 10/2016 |
| WO | 2017039042 | A1 | 3/2017 |

OTHER PUBLICATIONS

"Consideration on UP integrity configuration," 3GPP TSG RAN WG2 Meeting #99bis, Prague, Czech Republic, R2-1710314, 3rd Generation Partnership Project, Valbonne, France (Oct. 9-13, 2017).

"3rd Generation Partnership Project; Technical Specification Group Services and System Aspects; Study on the security aspects of the next generation system (Release 14)," 3GPP TR 33.899 V1.2.0, S3-171583, pp. 1-586, 3rd Generation Partnership Project, Valbonne, France (Jun. 2017).

"3rd Generation Partnership Project; Technical Specification Group Radio Access Network; Evolved Universal Terrestrial Radio Access (E-UTRA); Radio Resource Control (RRC); Protocol specification(Release 14)," 3GPP TS 36.331 V14.3.0, pp. 1-745, 3rd Generation Partnership Project, Valbonne, France (Jun. 2017).

"LS to SA3 on Counter Check Procedure," 3GPP TSG-RAN WG2 Meeting #98, Hangzhou, China, R2-1706036, 3rd Generation Partnership Project, Valbonne, France (May 15-19, 2017).

"3rd Generation Partnership Project; Technical Specification Group Radio Access Network; NR; Packet Data Convergence Protocol (PDCP) specification (Release 15)," 3GPP TS 38.323 V0.2.0, pp. 1-29, 3rd Generation Partnership Project, Valbonne, France (Aug. 2017).

3rd Generation Partnership Project; Technical Specification Group Services and System Aspects; Procedures for the 5G System;Stage 2(Release 15), 3GPP TS 23.502 V0.5.0, pp. 1-148, 3rd Generation Partnership Project, Valbonne, France (Jul. 2017).

"3rd Generation Partnership Project; Technical Specification Group Services and System Aspects; Security Architecture and Procedures for 5G System (Release 15)," 3GPP TS 33.501 V0.2.0, pp. 1-25, 3rd Generation Partnership Project, Valbonne, France (May 2017).

"3rd Generation Partnership Project; Technical Specification Group Services and System Aspects; Study on the security aspects of the next generation system(Release 14)," 3GPP TR 33.899 V1.2.0, pp. 1-586, 3rd Generation Partnership Project, Valbonne, France (Jun. 2017).

"3rd Generation Partnership Project; Technical Specification Group Radio Access Network; NR; NR and NG-RAN Overall Description; Stage 2(Release 15)," 3GPP TS 38.300 V0.6.0, pp. 1-58, 3rd Generation Partnership Project, Valbonne, France (Aug. 2017).

"3rd Generation Partnership Project; Technical Specification Group Radio Access Network; NR; Radio Resource Control (RRC); Protocol specification(Release 15 )," 3GPP TS 38.331 V0.0.4, pp. 1-22, 3rd Generation Partnership Project, Valbonne, France (Jun. 2017).

"Initiation of SDAP Entity," 3GPP TSG-RAN WG2 Meeting Adhoc#2,Qingdao,China, R2-1706789, pp. 1-2, 3rd Generation Partnership Project, Valbonne, France (Jun. 27-29, 2017).

* cited by examiner

DATA INTEGRITY PROTECTION METHOD AND APPARATUS

CROSS-REFERENCE TO RELATED APPLICATIONS

This application is a continuation of International Application No. PCT/CN2018/099916, filed on Aug. 10, 2018, which claims priority to Chinese Patent Application No. 201710686855.8, filed on Aug. 11, 2017. The disclosures of the aforementioned applications are hereby incorporated by reference in their entireties.

TECHNICAL FIELD

This application relates to communications technologies, and in particular, to a data integrity protection method and apparatus.

BACKGROUND

With rapid development of communications technologies, an information security issue of a mobile communications system attracts increasing attentions. A Long Term Evolution (LTE) system is used as an example. An objective of an integrity protection function in the LTE system is to prevent user data from being tampered. Once a receive end discovers an integrity check failure, an encryption/decryption key update procedure may be triggered, to protect the user data by using a new key.

The integrity protection function includes integrity protection and integrity check. The integrity protection function of LTE is implemented at a Packet Data Convergence Protocol (PDCP) layer. Before encryption, a transmit end performs integrity protection on both a header and a data portion of a PDCP protocol data unit (PDU). Specifically, the transmit end calculates, according to an integrity protection algorithm configured by an upper protocol layer, a 32-bit message authentication code (Message Authentication Code for Integrity, MAC-I) by using at least one of parameters such as a key, a COUNT value, a radio bearer identifier, DIRECTION, a message itself, and a length of the message as an input parameter, and places the 32-bit message authentication code into a MAC-I field of the PDCP PDU. After receiving the message, the receive end calculates, by using the same method, an expected authentication code XMAC-I for the message, and performs an integrity check by comparing the XMAC-I with the MAC-I. If the MAC-I is equal to the XMAC-I, the receive end determines that the integrity check succeeds; or if the MAC-I is not equal to the XMAC-I, the receive end determines that the integrity check fails.

However, the integrity protection function in the LTE system is at a granularity of a terminal device. In other words, a terminal device uses a same integrity protection parameter for all data, causing inflexible integrity protection.

SUMMARY

This application provides a data integrity protection method and apparatus, to perform integrity protection at a granularity of a session or at a granularity of a flow, so that the integrity protection is more flexible and meets security requirements of a same user for different services.

A first aspect of this application provides a data integrity protection method, including: obtaining, by a terminal device, an integrity protection algorithm and a key corresponding to a session, and a DRB corresponding to the session; and performing integrity protection on data of the DRB by using the integrity protection algorithm and the key. Different integrity protection algorithms and keys can be used for different sessions, so that integrity protection is more flexible and meets security requirements of a same user for different services.

Optionally, the obtaining, by a terminal device, an integrity protection algorithm and a key corresponding to a session, and a DRB corresponding to the session is specifically: sending, by the terminal device, a first message, where the first message is used to request to establish the session; and receiving, by the terminal device, a second message, where the second message includes: an identifier of the session, the integrity protection algorithm and the key corresponding to the session, and an identifier of the DRB corresponding to the session.

Optionally, the second message includes an SDAP layer configuration, and the SDAP layer configuration includes the identifier of the session, the integrity protection algorithm and the key corresponding to the session, and the identifier of the DRB corresponding to the session; or the second message includes a PDCP layer configuration, and the PDCP layer configuration includes the identifier of the session, the integrity protection algorithm and the key corresponding to the session, and the identifier of the DRB corresponding to the session.

A second aspect of this application provides a data integrity protection method, including: obtaining, by a terminal device, an integrity protection algorithm and a key corresponding to a flow, and a DRB corresponding to the flow; and performing integrity protection on data of the DRB by using the integrity protection algorithm and the key. Different integrity protection algorithms and keys can also be used for different flows, so that integrity protection is more flexible and meets security requirements of a same user for different services.

Optionally, the obtaining, by a terminal device, an integrity protection algorithm and a key corresponding to a flow, and a data radio bearer (DRB) corresponding to the flow is specifically: sending, by the terminal device, a first message, where the first message is used to request to establish a session, and the session corresponds to the flow; and receiving, by the terminal device, a second message, where the second message includes: an identifier of the session, an identifier of the flow, an identifier of the DRB corresponding to the flow, and the integrity protection algorithm and the key corresponding to the flow.

Optionally, the second message includes an SDAP layer configuration, and the SDAP layer configuration includes the identifier of the session, the identifier of the flow, the identifier of the DRB corresponding to the flow, and the integrity protection algorithm and the key corresponding to the flow; or the second message includes a PDCP layer configuration, and the PDCP layer configuration includes the identifier of the session, the identifier of the flow, the identifier of the DRB corresponding to the flow, and the integrity protection algorithm and the key corresponding to the flow.

Optionally, in the first aspect and the second aspect of this application, the method further includes: obtaining, by the terminal device, at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, in the first aspect and the second aspect of this application, the data of the DRB is an SDAP layer data packet of the DRB, or a PDCP layer data packet of the DRB.

When the data of the DRB is an SDAP layer data packet of the DRB, the method further includes: marking, by the terminal device, the identifier of the flow in the SDAP layer data packet of the DRB.

A third aspect of this application provides a data integrity protection method, including: receiving, by an access network device, a first message sent by a terminal device, where the first message is used to request to establish a session; sending, by the access network device, a third message to a core network device, where the third message includes the first message; receiving, by the access network device, a fourth message sent by the core network device, where the fourth message includes an integrity protection algorithm and a key corresponding to the session, and a DRB corresponding to the session; storing, by the access network device, the integrity protection algorithm and the key corresponding to the session, and the DRB corresponding to the session; and sending, by the access network device, a second message to the terminal device, where the second message includes: an identifier of the session, the integrity protection algorithm and the key corresponding to the session, and an identifier of the DRB corresponding to the session.

Optionally, the second message includes an SDAP layer configuration, and the SDAP layer configuration includes the identifier of the session, the integrity protection algorithm and the key corresponding to the session, and the identifier of the DRB corresponding to the session; or the second message includes a PDCP layer configuration, and the PDCP layer configuration includes the identifier of the session, the integrity protection algorithm and the key corresponding to the session, and the identifier of the DRB corresponding to the session.

A fourth aspect of this application provides a data integrity protection method, including: receiving, by an access network device, a first message sent by a terminal device, where the first message is used to request to establish a session; sending, by the access network device, a third message to a core network device, where the third message includes the first message; receiving, by the access network device, a fourth message sent by the core network device, where the fourth message includes an integrity protection algorithm and a key corresponding to a flow, and a data radio bearer (DRB) corresponding to the flow, and the session corresponds to the flow; storing, by the access network device, the integrity protection algorithm and the key corresponding to the flow, and the DRB corresponding to the flow; and sending, by the access network device, a second message to the terminal device, where the second message includes: an identifier of the session, an identifier of the flow, an identifier of the DRB corresponding to the flow, and the integrity protection algorithm and the key corresponding to the flow.

Optionally, the second message includes an SDAP layer configuration, and the SDAP layer configuration includes the identifier of the session, the identifier of the flow, the identifier of the DRB corresponding to the flow, and the integrity protection algorithm and the key corresponding to the flow; or the second message includes a PDCP layer configuration, and the PDCP layer configuration includes the identifier of the session, the identifier of the flow, the identifier of the DRB corresponding to the flow, and the integrity protection algorithm and the key corresponding to the flow.

Optionally, in the third aspect and the fourth aspect of this application, the third message or the second message further includes at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, in the third aspect and the fourth aspect of this application, the method further includes: performing, by the access network device, integrity protection on data of the DRB by using the integrity protection algorithm and the key.

Optionally, in the third aspect and the fourth aspect of this application, the data of the DRB is an SDAP layer data packet of the DRB, or a PDCP layer data packet of the DRB.

When the data of the DRB is an SDAP layer data packet of the DRB, the method further includes: marking, by the access network device, the identifier of the flow in the SDAP layer data packet of the DRB.

A fifth aspect of this application provides a data integrity protection method, including: receiving, by a core network device, a third message sent by an access network device, where the third message includes a first message, and the first message is used to request to establish a session; and sending, by the core network device, a fourth message to the access network device, where the fourth message includes an integrity protection algorithm and a key corresponding to the session, and a data radio bearer (DRB) corresponding to the session; or includes an integrity protection algorithm and a key corresponding to a flow, and a DRB corresponding to the flow, where the session corresponds to the flow.

Optionally, the fourth message further includes at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, the method further includes: performing, by the core network device, integrity protection on data of the DRB by using the integrity protection algorithm and the key.

Optionally, the data of the DRB is an SDAP layer data packet of the DRB, or a PDCP layer data packet of the DRB.

When the data of the DRB is an SDAP layer data packet of the DRB, the method further includes: marking, by the core network device, the identifier of the flow in the SDAP layer data packet of the DRB.

A sixth aspect of this application provides a terminal device, including: an obtaining module, configured to obtain an integrity protection algorithm and a key corresponding to a session, and a data radio bearer (DRB) corresponding to the session; and an integrity protection module, configured to perform integrity protection on data of the DRB by using the integrity protection algorithm and the key.

Optionally, the obtaining module is specifically configured to: send a first message, where the first message is used to request to establish the session; and receive a second message, where the second message includes: an identifier of the session, the integrity protection algorithm and the key corresponding to the session, and an identifier of the DRB corresponding to the session.

Optionally, the second message includes an SDAP layer configuration, and the SDAP layer configuration includes the identifier of the session, the integrity protection algorithm and the key corresponding to the session, and the identifier of the DRB corresponding to the session; or the second message includes a PDCP layer configuration, and the PDCP layer configuration includes the identifier of the session, the integrity protection algorithm and the key corresponding to the session, and the identifier of the DRB corresponding to the session.

A seventh aspect of this application provides a terminal device, including: an obtaining module, configured to obtain an integrity protection algorithm and a key corresponding to a flow, and a data radio bearer (DRB) corresponding to the flow; and an integrity protection module, configured to perform integrity protection on data of the DRB by using the integrity protection algorithm and the key.

Optionally, the obtaining module is specifically configured to: send a first message, where the first message is used to request to establish a session, and the session corresponds to the flow; and receive a second message, where the second message includes: an identifier of the session, an identifier of the flow, an identifier of the DRB corresponding to the flow, and the integrity protection algorithm and the key corresponding to the flow.

Optionally, the second message includes an SDAP layer configuration, and the SDAP layer configuration includes the identifier of the session, the identifier of the flow, the identifier of the DRB corresponding to the flow, and the integrity protection algorithm and the key corresponding to the flow; or the second message includes a PDCP layer configuration, and the PDCP layer configuration includes the identifier of the session, the identifier of the flow, the identifier of the DRB corresponding to the flow, and the integrity protection algorithm and the key corresponding to the flow.

Optionally, in the sixth aspect and the seventh aspect of this application, the obtaining module is further configured to: obtain at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, in the sixth aspect and the seventh aspect of this application, the data of the DRB is an SDAP layer data packet of the DRB, or a PDCP layer data packet of the DRB.

When the data of the DRB is an SDAP layer data packet of the DRB, the terminal device further includes: a marking module, configured to mark the identifier of the flow in the SDAP layer data packet of the DRB.

An eighth aspect of this application provides an access network device, including: a receiving module, configured to receive a first message sent by a terminal device, where the first message is used to request to establish a session; a sending module, configured to send a third message to a core network device, where the third message includes the first message, where the receiving module is further configured to receive a fourth message sent by the core network device, where the fourth message includes an integrity protection algorithm and a key corresponding to the session, and a data radio bearer (DRB) corresponding to the session; and a storing module, configured to store the integrity protection algorithm and the key corresponding to the session, and the DRB corresponding to the session, where the sending module is further configured to send a second message to the terminal device, where the second message includes: an identifier of the session, the integrity protection algorithm and the key corresponding to the session, and an identifier of the DRB corresponding to the session.

Optionally, the second message includes an SDAP layer configuration, and the SDAP layer configuration includes the identifier of the session, the integrity protection algorithm and the key corresponding to the session, and the identifier of the DRB corresponding to the session; or the second message includes a PDCP layer configuration, and the PDCP layer configuration includes the identifier of the session, the integrity protection algorithm and the key corresponding to the session, and the identifier of the DRB corresponding to the session.

A ninth aspect of this application provides an access network device, including: a receiving module, configured to receive a first message sent by a terminal device, where the first message is used to request to establish a session; a sending module, configured to send a third message to a core network device, where the third message includes the first message, where the receiving module is further configured to receive a fourth message sent by the core network device, where the fourth message includes an integrity protection algorithm and a key corresponding to a flow, and a data radio bearer (DRB) corresponding to the flow, and the session corresponds to the flow; and a storing module, configured to store the integrity protection algorithm and the key corresponding to the flow, and the DRB corresponding to the flow, where the sending module is further configured to send a second message to the terminal device, where the second message includes: an identifier of the session, an identifier of the flow, an identifier of the DRB corresponding to the flow, and the integrity protection algorithm and the key corresponding to the flow.

Optionally, the second message includes an SDAP layer configuration, and the SDAP layer configuration includes the identifier of the session, the identifier of the flow, the identifier of the DRB corresponding to the flow, and the integrity protection algorithm and the key corresponding to the flow; or the second message includes a PDCP layer configuration, and the PDCP layer configuration includes the identifier of the session, the identifier of the flow, the identifier of the DRB corresponding to the flow, and the integrity protection algorithm and the key corresponding to the flow.

In the eighth aspect and the ninth aspect of this application, the third message or the second message further includes at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, the access network device further includes: an integrity protection module, configured to perform integrity protection on data of the DRB by using the integrity protection algorithm and the key.

Optionally, the data of the DRB is an SDAP layer data packet of the DRB, or a PDCP layer data packet of the DRB.

When the data of the DRB is an SDAP layer data packet of the DRB, the access network device further includes: a marking module, configured to mark the identifier of the flow in the SDAP layer data packet of the DRB.

A tenth aspect of this application provides a core network device, including: a receiving module, configured to receive a third message sent by an access network device, where the third message includes a first message, and the first message is used to request to establish a session; and a sending module, configured to send a fourth message to the access network device, where the fourth message includes an integrity protection algorithm and a key corresponding to the session, and a data radio bearer (DRB) corresponding to the session; or includes an integrity protection algorithm and a key corresponding to a flow, and a DRB corresponding to the flow, where the session corresponds to the flow.

Optionally, the fourth message further includes at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, the core network device further includes: an integrity protection module, configured to perform integrity protection on data of the DRB by using the integrity protection algorithm and the key.

Optionally, the data of the DRB is an SDAP layer data packet of the DRB, or a PDCP layer data packet of the DRB.

When the data of the DRB is an SDAP layer data packet of the DRB, the core network device further includes: a marking module, configured to mark the identifier of the flow in the SDAP layer data packet of the DRB.

An eleventh aspect of this application provides a terminal device, including: a processor, a memory, a receiver, and a transmitter, where the memory, the receiver, and the transmitter are connected to and communicate with the processor by using a bus, the memory is configured to store a computer executable instruction, and the processor is configured to execute the computer executable instruction, so that the terminal device performs the methods provided according to the first aspect and the second aspect.

A twelfth aspect of this application provides an access network device, including: a processor, a memory, a receiver, and a transmitter, where the memory, the receiver, and the transmitter are connected to and communicate with the processor by using a bus, the memory is configured to store a computer executable instruction, and the processor is configured to execute the computer executable instruction, so that the access network device performs the methods provided according to the third aspect and the fourth aspect.

A thirteenth aspect of this application provides a core network device, including: a processor, a memory, a receiver, and a transmitter, where the memory, the receiver, and the transmitter are connected to and communicate with the processor by using a bus, the memory is configured to store a computer executable instruction, and the processor is configured to execute the computer executable instruction, so that the core network device performs the method provided according to the fifth aspect.

A fourteenth aspect of this application provides a computer readable medium, where the computer readable medium includes a computer executable instruction, and the computer executable instruction is used to enable a terminal device to perform the methods provided according to the first aspect and the second aspect of this application.

A fifteenth aspect of this application provides a computer readable medium, where the computer readable medium includes a computer executable instruction, and the computer executable instruction is used to enable an access network device to perform the methods provided according to the third aspect and the fourth aspect of this application.

A sixteenth aspect of this application provides a computer readable medium, where the computer readable medium includes a computer executable instruction, and the computer executable instruction is used to enable a core network device to perform the method provided according to the fifth aspect of this application.

A seventeenth aspect of this application provides an on-chip system. The system may be applied to a terminal device, and the on-chip system includes: at least one communications interface, at least one processor, and at least one memory, where the communications interface, the memory, and the processor are interconnected by using a bus, and the processor invokes an instruction stored in the memory, to perform the methods provided according to the first aspect and the second aspect of this application.

An eighteenth aspect of this application provides an on-chip system. The system may be applied to an access network device, and the on-chip system includes: at least one communications interface, at least one processor, and at least one memory, where the communications interface, the memory, and the processor are interconnected by using a bus, and the processor invokes an instruction stored in the memory, to perform the methods provided according to the third aspect and the fourth aspect of this application.

A nineteenth aspect of this application provides an on-chip system. The system may be applied to a core network device, and the on-chip system includes: at least one communications interface, at least one processor, and at least one memory, where the communications interface, the memory, and the processor are interconnected by using a bus, and the processor invokes an instruction stored in the memory, to perform the method provided according to the fifth aspect of this application.

A twentieth aspect of this application provides a program product, where the program product includes a computer program, the computer program is stored in a readable storage medium, and at least one processor of a terminal device executes the computer program, so that the terminal device implements the methods provided according to the first aspect and the second aspect of this application.

A twenty-first aspect of this application provides a program product, where the program product includes a computer program, the computer program is stored in a readable storage medium, and at least one processor of an access network device executes the computer program, so that the access network device implements the methods provided according to the third aspect and the fourth aspect of this application.

A twenty-second aspect of this application provides a program product, where the program product includes a computer program, the computer program is stored in a readable storage medium, and at least one processor of a core network device executes the computer program, so that the core network device implements the method provided according to the fifth aspect of this application.

This application provides a data integrity protection method and apparatus. The terminal device obtains the integrity protection algorithm and the key corresponding to the session, and the DRB corresponding to the session, and performs, by using the integrity protection algorithm and the key corresponding to the session, integrity protection on the data of the DRB corresponding to the session; or the terminal device obtains the integrity protection algorithm and the key corresponding to the flow, and the DRB corresponding to the flow, and performs, by using the integrity protection algorithm and the key corresponding to the flow, integrity protection on the data of the DRB corresponding to the flow. One session includes a plurality of flows, different integrity protection algorithms and keys can be used for different sessions, and different integrity protection algorithms and keys can also be used for different flows, so that integrity protection is more flexible and meets security requirements of a same user for different services.

DESCRIPTION OF EMBODIMENTS

This application provides a data integrity protection method, which may be applied to a plurality of types of communications systems. The communications system may be a Universal Mobile Telecommunications System (UMTS), a Code Division Multiple Access (CDMA) system, a Wideband Code Division Multiple Access (WCDMA) system, a wireless local area network (WLAN), a Long Term Evolution (LTE) system, or a fifth-generation mobile communications (5G) system.

Figure 1:
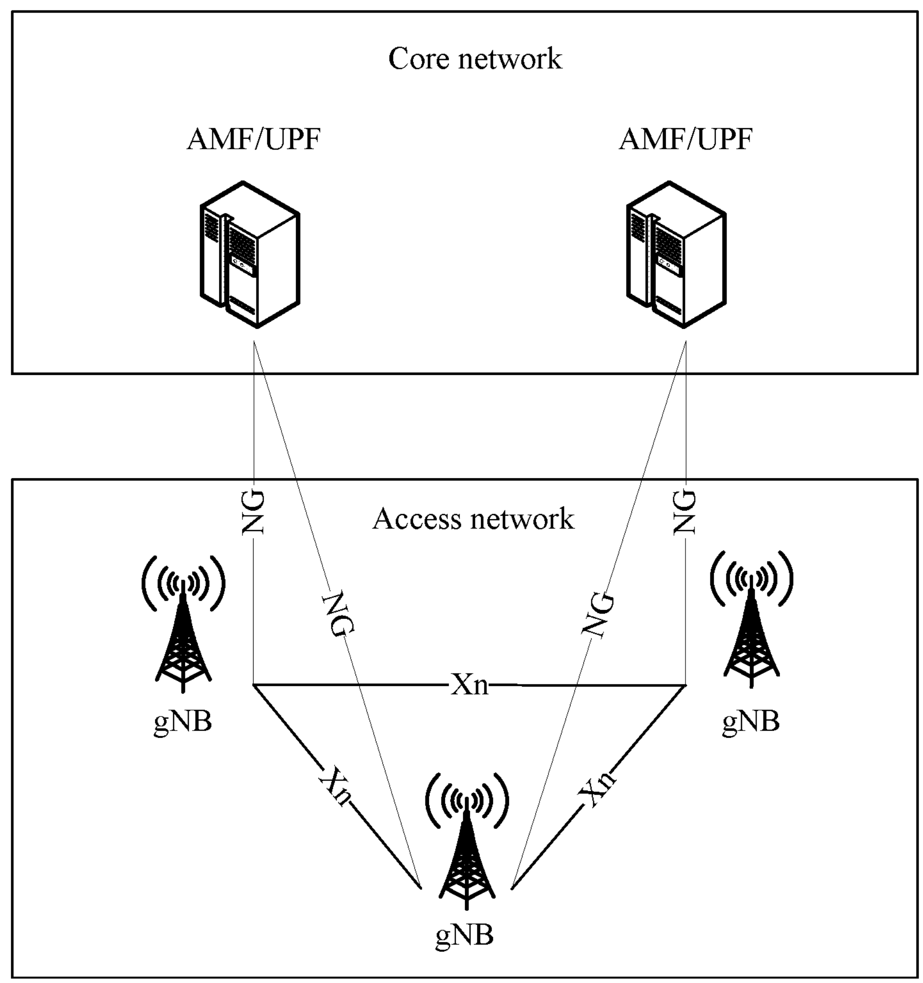
FIG. 1 is a schematic architectural diagram of an application scenario according to this application.

FIG. 1 is a schematic architectural diagram of an application scenario according to this application. As shown in FIG. 1, a 5G system may include: a (radio) access network ((R)AN), a core network (CN), and a terminal device. The RAN is responsible for access of the terminal device. A plurality of terminal devices are included in a coverage area of the RAN. An interface between the RAN and the core network is a next generation (NG) interface. An interface between RAN network elements is an Xn interface. An interface between a RAN network element and the terminal device is an air interface. The RAN network element may be a base station in a UMTS system, a base station (Base Transceiver Station, BTS) in a CDMA system, a base station (NodeB, NB) in a WCDMA system, an evolved base station (evolved NodeB, eNB) or a relay station in an LTE system, an access point (AP) in a WLAN, a base station (for example, a gNB or a transmission point (TRP)) in a 5G system, or the like. The 5G system is also referred to as a new radio communications system, a new radio technology, or a next-generation mobile communications system. In the next-generation mobile communications system, a flow-based quality-of-service (QoS) architecture is put forward. A flow is, for example, a QoS flow. QoS is classified into non-access stratum (NAS) layer QoS and access stratum (AS) layer QoS. The NAS layer QoS is at a QoS flow level. A QoS flow is a minimum granularity for QoS discrimination in a protocol data unit (PDU) session, and is a set of data packets. Same processing is performed on data packets that are included in a single QoS flow.

Core network elements include an access and mobility management function (AMF) entity and a user plane function (UPF) entity. The AMF entity is mainly responsible for services such as mobility management and access management, and is equivalent to functions of a mobility management entity (MME) in the LTE system except a session management function. The UPF is equivalent to a packet data network gateway (P-GW) in the LTE system, and is responsible for functions such as session and bearer management and Internet Protocol (IP) address allocation. The UPF generates a downlink QoS flow, and UE generates an uplink QoS flow.

Optionally, the core network elements may further include a session management function (SMF) entity, an authentication server function (AUSF) entity/authentication credential repository and processing function (ARPF) entity, a policy control function (PCF) entity, and an Authentication, Authorization, and Accounting (AAA) server.

The SMF entity is mainly responsible for establishing a session, modifying a session, or releasing a session. The PCF entity is mainly responsible for providing a policy for a network. The AAA server is mainly responsible for authenticating a subscriber identification module (SIM) card, authorizing services that can be used by the SIM card, and recording a network resource used by the SIM card. The AAA server may be provided by an operator, or may be provided by a third party. The AUSF is a termination point of an authentication request message, and interacts with the ARPF entity to obtain a long-term security credential of the terminal device. The ARPF entity is mainly responsible for storing the long-term security credential of the terminal device.

When the method in this application is applied to the LTE system, the AMF entity and the SMF entity may be replaced with the MME, the UPF entity may be replaced with a P-GW entity and a serving gateway (S-GW) entity in the LTE system, and the AUSF entity and the ARPF entity may be replaced with a home subscriber server (HSS). The HSS is configured to store subscription information. The subscription information may be subscription information of the SIM card. The MME is a signaling management network element, and is responsible for encrypting NAS signaling, allocating a temporary identity for the terminal device, selecting core network elements such as an SGW and a PGW, and providing functions such as roaming, tracing, and security. The SGW is a mobility anchor for handover between eNBs, and provides functions related to lawful interception. The PGW is responsible for functions such as IP address allocation, solution control, charging rule enforcement, and lawful interception.

The terminal device in this application may be a wireless terminal. The wireless terminal may be a device that provides a user with voice and/or data connectivity, a handheld device having a wireless connection function, or another processing device connected to a wireless modem. The wireless terminal may communicate with at least one core network through the (R)AN. The wireless terminal may be a mobile terminal, such as a mobile phone (or also referred to as a "cellular" phone) or a computer that has a mobile terminal. For example, the wireless terminal may be a portable, pocket-sized, handheld, computer built-in, or in-vehicle mobile apparatus, which exchanges voice and/or data with the radio access network. The wireless terminal may also be referred to as a subscriber unit, a subscriber station, a mobile station, a remote station, an access point, a remote terminal, an access terminal, a user terminal, user equipment (UE), or a user agent. This is not limited herein.

Based on the communications system shown in FIG. 1, the data integrity protection method provided in this application is to resolve a problem of inflexible integrity protection in the prior art.

The following uses specific embodiments to detail the technical solutions of this application and how the technical solutions of this application are used to resolve the foregoing technical problem. The following several specific embodiments may be combined, and a same or similar concept or process may not be described repeatedly in some embodiments. The following describes the embodiments of this application with reference to the accompanying drawings.

Figure 2:
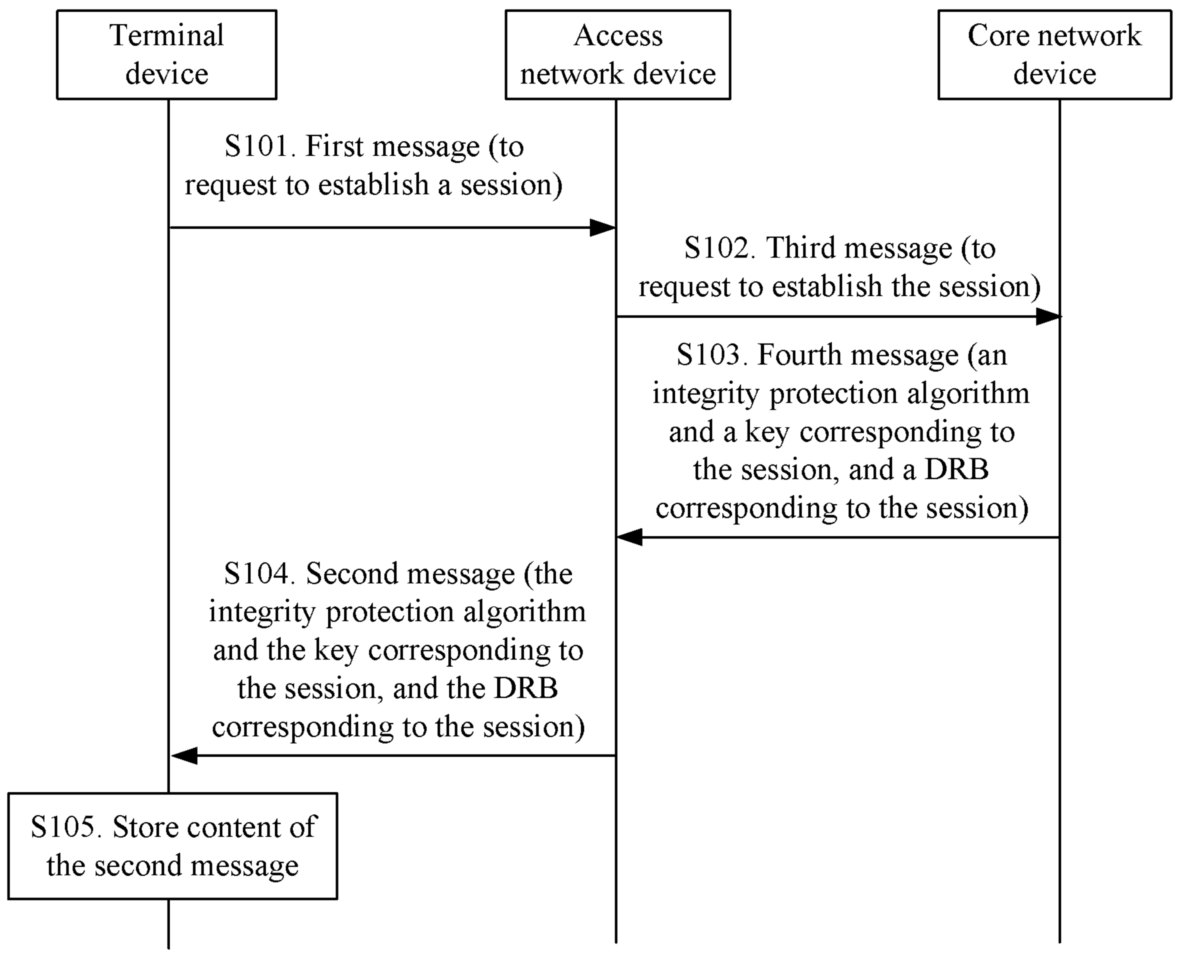
FIG. 2 is a signaling flowchart of a data integrity protection method according to Embodiment 1 of this application.

FIG. 2 is a signaling flowchart of a data integrity protection method according to an Embodiment 1 of this application. The method in this embodiment may mainly include the following steps.

Step S101: A terminal device sends a first message to an access network device.

The first message is used to request to establish a session. The session is also referred to as a PDU session. The first message may carry a NAS message. The NAS message carries session setup request message. The session setup request message includes an identifier of the session to be established. The session setup request message may further include a protocol discriminator, used to indicate an L3 protocol stack corresponding to the first message. If the session setup request message is carried by using the NAS message, an access network adds the NAS message to a third message and sends the third message to a core network device.

For example, the first message may be a radio resource control (RRC) message, a Media Access Control (MAC) message, a physical layer message, or the like. The RRC message is, for example, an RRC connection setup request, an RRC connection re-setup request, an RRC connection setup complete message, or the like. The MAC message is, for example, a MAC control element (CE). The physical layer message is, for example, physical layer signaling.

Step S102: The access network device sends a third message to a core network device, where the third message includes the first message.

The third message is used to request to establish the session. Specifically, after receiving the first message, the access network device adds the NAS message in the first message to the third message and sends the third message to the core network device. The third message is an interface message between a RAN and a core network.

Step S103: The core network device sends a fourth message to the access network device, where the fourth message includes an integrity protection algorithm and a key corresponding to the session, and a data radio bearer (DRB) corresponding to the session.

The fourth message is used to request the access network device to prepare a resource for the session to be established. The fourth message may be a UE initial context setup request message, used to establish a context configuration for the UE; or the fourth message is a PDU session resource setup request message, used to configure the resource for the session. The fourth message carries session information and an integrity protection configuration corresponding to the session. The session information includes the identifier of the session and the DRB corresponding to the session. Optionally, the fourth message carries a NAS message, and the integrity protection configuration corresponding to the session is carried in the NAS message. Certainly, the integrity protection configuration corresponding to the session may not be carried in the NAS message.

Figure 3:
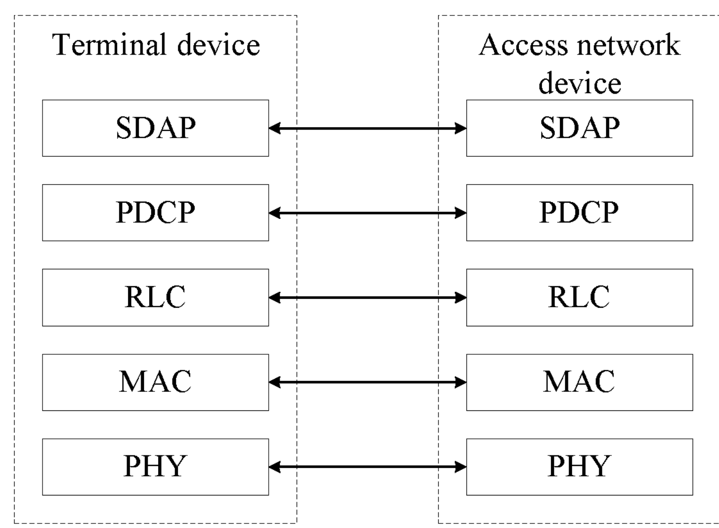
FIG. 3 is a schematic diagram of protocol layers of a 5G system.

The fourth message further includes a configuration parameter of at least one protocol layer, used to establish one or more DRBs for the session, so as to carry a service initiated by the terminal device. FIG. 3 is a schematic diagram of protocol layers of a 5G system. As shown in FIG. 3, from top to bottom, protocol layers of a terminal device and an access device are sequentially a Service Data Aggregation Protocol (SDAP) layer, a PDCP layer, a Radio Link Control (RLC) layer, a MAC layer, and a physical (PHY) layer. The SDAP layer is a protocol layer newly added to an LTE system. The SDAP layer is used to process a mapping from a flow to a DRB. In this embodiment, one terminal device may establish a plurality of sessions, each session includes one or more flows, each flow may be mapped to one or more DRBs, and the flow is, for example, a QoS flow.

For example, the configuration parameter of the at least one protocol layer includes a parameter of a protocol stack of each layer, a transmission mode, a logical channel configuration, and a scheduling-related parameter. The transmission mode may be an RLC transparent transmission mode, an acknowledged mode, or an unacknowledged mode. The logical channel configuration is, for example, a logical channel priority. For specific content, refer to LTE or 5G protocols. Details are not described herein.

In this embodiment, the integrity protection configuration corresponding to the session carried in the fourth message includes the integrity protection algorithm and the key corresponding to the session. Optionally, the fourth message may not carry the integrity protection algorithm and the key corresponding to the session, and the integrity protection algorithm and the key corresponding to the session are carried by using another message, or the integrity protection algorithm and the key corresponding to the session are configured in advance. The fourth message may further include at least one of the following information: an indication of an integrity protection position, a position indication of an integrity protection protocol layer, an enabling indication of the integrity protection position, and an indication of an integrity protection object. Likewise, one or more of the indication of the integrity protection position, the position indication of the integrity protection protocol layer, the enabling indication of the integrity protection position, and the indication of the integrity protection object may be configured in advance, instead of being dynamically indicated by using the fourth message.

The indication of the integrity protection position is used to indicate a network element where integrity protection is performed. The integrity protection may be implemented on a RAN side, or implemented on a core network side, or implemented on both a RAN side and a core network side, or the like. Therefore, the network element for the integrity protection may be the access network device or the core network device, or the integrity protection may be performed at both the access network device and the core network device. When the integrity protection position is the RAN side, an integrity protection function is performed by a protocol stack on the RAN side, and a corresponding terminal device side performs the integrity protection function at an access stratum. When the integrity protection position is the core network side, the integrity protection function needs to be performed by a protocol stack on the core network side, and the corresponding terminal device side performs the integrity protection function at a non-access stratum. When the integrity protection position is both the RAN side and the core network side, the integrity protection function needs to be performed on both the RAN side and the core network side, and control plane or data plane integrity protection of a user needs to be performed twice.

The position indication of the integrity protection protocol layer is used to indicate a protocol layer where integrity protection is performed. The protocol layer for the integrity protection may be the SDAP layer, the PDCP layer, or the RLC layer.

The enabling indication of the integrity protection position is used to indicate whether to enable the integrity protection function or not. The enabling indication of the integrity protection position is associated with the indication of the integrity protection position. For example, if the integrity protection position indicated by the indication of the integrity protection position is the RAN side, the enabling indication of the integrity protection position is used to indicate that the integrity protection function is enabled or disabled on the RAN side. If the integrity protection position indicated by the indication of the integrity protection position is both the RAN side and the core network side, the enabling indication of the integrity protection position is used to separately indicate that the integrity protection function is enabled or disabled on the RAN side and the core network side.

The indication of the integrity protection object is used to indicate that an object for integrity protection is user plane (UP) data, or user plane data and control plane (CP) signaling.

Same or different integrity protection algorithms and keys can be used for different sessions. The integrity protection algorithm and the key correspond to the integrity protection position. For example, if the core network device indicates only one integrity protection position (the RAN side or the core network side), a corresponding integrity protection algorithm and key are configured only at the integrity protection position. If the core network device indicates two integrity protection positions (both the RAN side and the core network side), a corresponding integrity protection algorithm and key need to be configured for the two integrity protection positions, and the protection algorithms and keys corresponding to the two integrity protection positions may be the same or different.

In one manner, keys to be used for different sessions may be obtained through calculation based on a root key. The keys obtained for the different sessions may be different or the same. The root key may be a root key obtained by the access network device in an SMC procedure.

In another manner, keys to be used for different sessions may be obtained through calculation based on different root keys. For example, the fourth message indicates a root key to be used for the session, or transfers a related parameter, so that the access network device calculates, based on the root key, a key to be used for the session.

In this embodiment, the integrity protection configuration corresponding to the session may be placed in a PDU session information list (PDU Session Resource Setup List) in the fourth message, to indicate the integrity protection configuration corresponding to the session, or may be placed separately in the fourth message, with a session identifier corresponding to the integrity protection configuration added. The access network device learns of the integrity protection configuration corresponding to the session from the fourth message, and further learns of an integrity protection configuration of the DRB corresponding to the session. Table 1 is a schematic structural diagram of the fourth message, Table 2 is a schematic diagram of the PDU session information list, and Table 3 is a schematic diagram of a PDU Session Setup Request Transfer. The fourth message shown in Table 1 is, for example, a PDU session resource setup request message in section 9.2.1.1 of the 3rd Generation Partnership Project (3GPP) Next Generation (NG) RAN NG Application Protocol (NGAP) whose protocol version number is 0.1.0. The PDU session information list in Table 2 is, for example, a PDU session resource setup list message in section 9.3.1.5 of the 3GPP NG RAN NGAP whose protocol version number is 0.1.0.

TABLE 1

| IE/Group Name (Information element/Group name) | Presence | Range | IE type and reference (Information element type and reference) | Semantics description | Criticality | Assigned Criticality |
|---|---|---|---|---|---|---|
| Message Type | M (Mandatory) | | <ref> | | YES | reject |
| AMF UE NGAP ID | M (Mandatory) | | <ref> | | YES | reject |
| gNB UE NGAP ID | M (Mandatory) | | <ref> | | YES | reject |
| NAS PDU | FFS (For further study) | | <ref> | | YES | reject |
| PDU Session Resource Setup List | M (Mandatory) | | <ref> | | YES | reject |

TABLE 2

| IE/Group Name | Presence | Range | IE type and reference | Semantics description | Criticality | Assigned Criticality |
|---|---|---|---|---|---|---|
| PDU Session Resource Setup List | | 1 | | | YES | reject |
| > PDU Session Resource Setup Item IEs | | 1 . . . <maxnoofPDUSessionResources> 1 . . . <Maximum number of PDU session resources> | | | EACH | reject |
| >> PDU Session ID [FFS] | M (Mandatory) | | <ref> | | — | |
| >> S-NSSAI (Single Network Slice Selection Assistance Information) | O | | <ref> | | — | |
| >> PDU Session Setup Request Transfer | O (Optional) | | <ref> | | — | |
| >> Integrity protection configuration (Optional position 1) | | | | | | |

TABLE 3

| IE/Group Name | Presence | Range | IE type and reference | Semantics description | Criticality | Assigned Criticality |
|---|---|---|---|---|---|---|
| PDU Session Setup Request Transfer | | 1 | | | YES | reject |
| > Integrity protection configuration (Optional position 2) | | | | | | |
| > PDU Session Resource Aggregated Maximum Bitrate | M (Mandatory) | | <ref> | | — | |

TABLE 3-continued

| IE/Group Name | Presence | Range | IE type and reference | Semantics description | Criticality | Assigned Criticality |
|---|---|---|---|---|---|---|
| > Transport Layer Information | M (Mandatory) | | <ref> | | — | |
| > PDU Session Type (PDU Session Type) | M (Mandatory) | | <ref> | | — | |
| > QoS Flows Setup List | | 1 | | | — | |
| >> QoS Flows Setup Item IEs | | 1 . . . <maxnoofQoSFlows> | | | — | |
| >>> QoS Flow Indicator | M (Mandatory) | | <ref> | | EACH | reject |
| >>> QoS Flow Level QoS Parameters (QoS Flow Level QoS Parameters) | FFS | | <ref> | | EACH | reject |
| >>> Reflective QoS Activation | O (Optional) | | <ref> | | EACH | reject |

Table 2 and Table 3 show two possible positions of the integrity protection configuration corresponding to the session in the fourth message. In Table 2, the integrity protection configuration corresponding to the session is carried in a PDU session resource setup list, and the PDU session resource setup list includes one or more session resource setup information elements (IE). Each information element protects at least one of the following information: a session identifier (session ID), and single network slice selection assistance information. The network slice selection assistance information is used to indicate a network slice identifier corresponding to the session. In Table 3, the integrity protection configuration corresponding to the session is carried in a PDU Session Setup Request Transfer, and the PDU Session Setup Request Transfer includes at least one of the following information: a maximum aggregated bit rate corresponding to one or more sessions, transport layer information, a session type, a QoS flow resource information list, and the like. The QoS flow resource information list includes an identifier corresponding to one or more flows, a QoS parameter of a QoS flow level, and the like.

Step S104: The access network device sends a second message to the terminal device, where the second message includes: an identifier of the session, the integrity protection algorithm and the key corresponding to the session, and an identifier of the DRB corresponding to the session.

After receiving the fourth message, the access network device: stores the integrity protection configuration carried in the fourth message, such as the integrity protection algorithm and the key corresponding to the session; establishes a DRB for the terminal device based on the configuration parameter of the at least one protocol layer that is carried in the fourth message to carry a service initiated by the terminal device; generates the second message; and sends the second message to the terminal device. The second message may be a NAS message, an RRC message, a MAC layer message, or a physical layer message. When the second message is an RRC message: if the RRC message does not include a NAS message, then the identifier of the session, the integrity protection algorithm and the key corresponding to the session, and the identifier of the DRB corresponding to the session are all carried in the RRC message; if the RRC message includes a NAS message, then all or some of the foregoing parameters are carried in the NAS message that is included in the RRC message.

In this embodiment, the second message includes the integrity protection algorithm and the key corresponding to the session. Optionally, the second message may not carry the integrity protection algorithm and the key corresponding to the session, and the integrity protection algorithm and the key corresponding to the session are carried by using another message, or the integrity protection algorithm and the key corresponding to the session are configured in advance. In another embodiment, the second message includes at least one of the following information: an integrity protection algorithm and a key, an indication of an integrity protection position, a position indication of an integrity protection protocol layer, an enabling indication of the integrity protection position, and an indication of an integrity protection object. Likewise, one or more of the indication of the integrity protection position, the position indication of the integrity protection protocol layer, the enabling indication of the integrity protection position, and the indication of the integrity protection object may be configured in advance, instead of being dynamically indicated by using the second message.

The integrity protection configuration carried in the second message may be the same as or different from the integrity protection configuration carried in the fourth message. For example, if the fourth message indicates a root key to be used for the session, after receiving the fourth message, the access network device calculates, based on the indicated root key, a key to be used for the session, and then adds the key to be used for the session to the second message.

Optionally, the integrity protection configuration corresponding to the session may be carried in an SDAP layer configuration parameter in the second message. That is, the integrity protection configuration is used as the SDAP layer configuration parameter. Alternatively, the integrity protection configuration corresponding to the session may be carried in a PDCP layer configuration parameter. That is, the integrity protection configuration is used as the PDCP layer configuration parameter. The second message includes a configuration parameter of at least one protocol layer. Both the SDAP layer configuration parameter and the PDCP layer configuration parameter may be carried in the second message; or one of the configuration parameters is carried in the second message, and the other configuration message is carried in another message different from the second message. The following describes several possible positions of the integrity protection configuration in the second message. For example, the second message is an RRC connection reconfiguration message. The RRC connection reconfiguration message is, for example, the following RRC connection reconfiguration message in section 6.2.2 of the 3 GPP evolved universal terrestrial radio access (E-UTRA) RRC protocol whose protocol version number is 13.0.0.

```
    RRC connection reconfiguration message
    RRCConnectionReconfiguration-r8-IEs ::= SEQUENCE {
      measConfig                                             MeasConfig
                  OPTIONAL,      -- Need ON
      mobilityControlInfo                                  MobilityControlInfo
      OPTIONAL,  -- Cond HO
      dedicatedInfoNASList                                 SEQUENCE
(SIZE(1..maxDRB)) OF
  DedicatedInfoNAS                 OPTIONAL,           --  Cond nonHO
      radioResourceConfigDedicated                   RadioResourceConfigDedicated
  OPTIONAL, -- Cond HO-toEUTRA
    RadioResourceConfigDedicated                        information          element
(RadioResourceConfigDedicated information element)
    RadioResourceConfigDedicated ::=                SEQUENCE {
      srb-ToAddModList                                     SRB-ToAddModList
  (SRB-To add/modify a list)       sdap-ToAddModList        SDAP-ToAddModList
(SDAP-To add/modify a list)
      SDAP-ToAddMod ::= SEQUENCE{
        Sdap-Identity                                        (SDAP identifier)
        (Possible position 1) Integrity protection configuration}
      drb-ToAddModList                                     DRB-ToAddModList (DRB-
To add/modify a list)
      DRB-ToAddMod ::= SEQUENCE {
        eps-BearerIdentity           (Evolved packet core, evolved packet system bearer
identifier)
        drb-Identity                 (DRB identifier)
        PDCP-Config                  (PDCP configuration) {Possible position 2 of the
integrity protection configuration}
        rlc-Config                                      (RLC configuration)
        logicalChannelIdentity                               (Logical channel identifier)
        LogicalChannelConfig                           (Logical channel configuration)
        ...,
      }
    }
```

In the foregoing example, the possible position 1 of the integrity protection configuration corresponding to the session is the SDAP layer configuration parameter, and the possible position 2 of the integrity protection configuration corresponding to the session is the PDCP layer configuration parameter.

Optionally, after step S104, the access network device sends a fifth message to the core network device. The fifth message is used to feed back a processing result of the fourth message sent by the core network device. If the access network device fails to configure a context of the terminal device, the fifth message is used to feed back a configuration failure and includes a failure cause indication, namely, a cause value. The fifth message is further used to carry an air interface resource allocated by the access network device for one or more sessions, and includes, for example, an established session information list of the access network device, and a list of QoS flows that cannot be established.

Step S105: The terminal device stores content of the second message.

The terminal device stores the integrity protection configuration corresponding to the session carried in the second message, to subsequently perform, based on the stored integrity protection configuration corresponding to the session, integrity protection on data of the DRB corresponding to the session. The session may correspond to one or more DRBs. If the session corresponds to a plurality of DRBs, integrity protection configurations used for the plurality of DRBs corresponding to the session are the same.

Specifically, the terminal device performs, by using the integrity protection algorithm and the key corresponding to the session, integrity protection on the data of the DRB corresponding to the session. The data of the DRB is an SDAP layer data packet or a PDCP layer data packet of the DRB. In other words, the terminal device may perform, at an SDAP layer and a PDCP layer, integrity protection on the data of the DRB. SDAP layer data packets include a PDU and a service data unit (SDU), and PDCP layer data packets also include a PDU and an SDU.

That the terminal device is a transmit end and the data of the DRB is a PDCP layer data packet is used as an example. The terminal device calculates, according to the integrity protection algorithm, a 32-bit MAC-I by using at least one of parameters such as the key, a COUNT value, a radio bearer identifier, DIRECTION, the PDCP layer data packet itself, and a length of the PDCP layer data packet as an input parameter, and places the 32-bit MAC-I into a MAC-I field of the PDCP PDU. After receiving the PDCP layer data packet, a receive end (the access network device or the core network device) calculates, by using the same method, an expected authentication code XMAC-I for the PDCP layer data packet, and performs an integrity check by comparing the XMAC-I with the MAC-I. If the MAC-I is equal to the XMAC-I, the receive end determines that the integrity check succeeds; or if the MAC-I is not equal to the XMAC-I, the receive end determines that the integrity check fails. Certainly, the terminal device may also serve as the receive end.

In this embodiment, the terminal device obtains, by using the second message, the integrity protection algorithm and the key corresponding to the session from the access network device. It should be noted that the terminal device may alternatively obtain, in another manner, the integrity protection algorithm and the key corresponding to the session. For example, the integrity protection algorithm and the key corresponding to the session are configured in advance on the terminal device, the second message needs to carry only the session identifier, and the terminal device finds, based on the session identifier, the integrity protection algorithm and the key corresponding to the session. Likewise, other integrity protection configurations of the session, for example, one or more of the indication of the integrity protection position, the position indication of the integrity protection protocol layer, the enabling indication of the integrity protection position, and the indication of the integrity protection object may be dynamically indicated by using the second message, or notified in a pre-configuration manner to the terminal device.

In this embodiment, the terminal device obtains the integrity protection algorithm and the key corresponding to the session, and the DRB corresponding to the session, and performs, by using the integrity protection algorithm and the key corresponding to the session, integrity protection on the data of the DRB, so that different integrity protection algorithms and keys can be used for different sessions, and integrity protection is more flexible and meets security requirements of a same user for different services.

Figure 4:
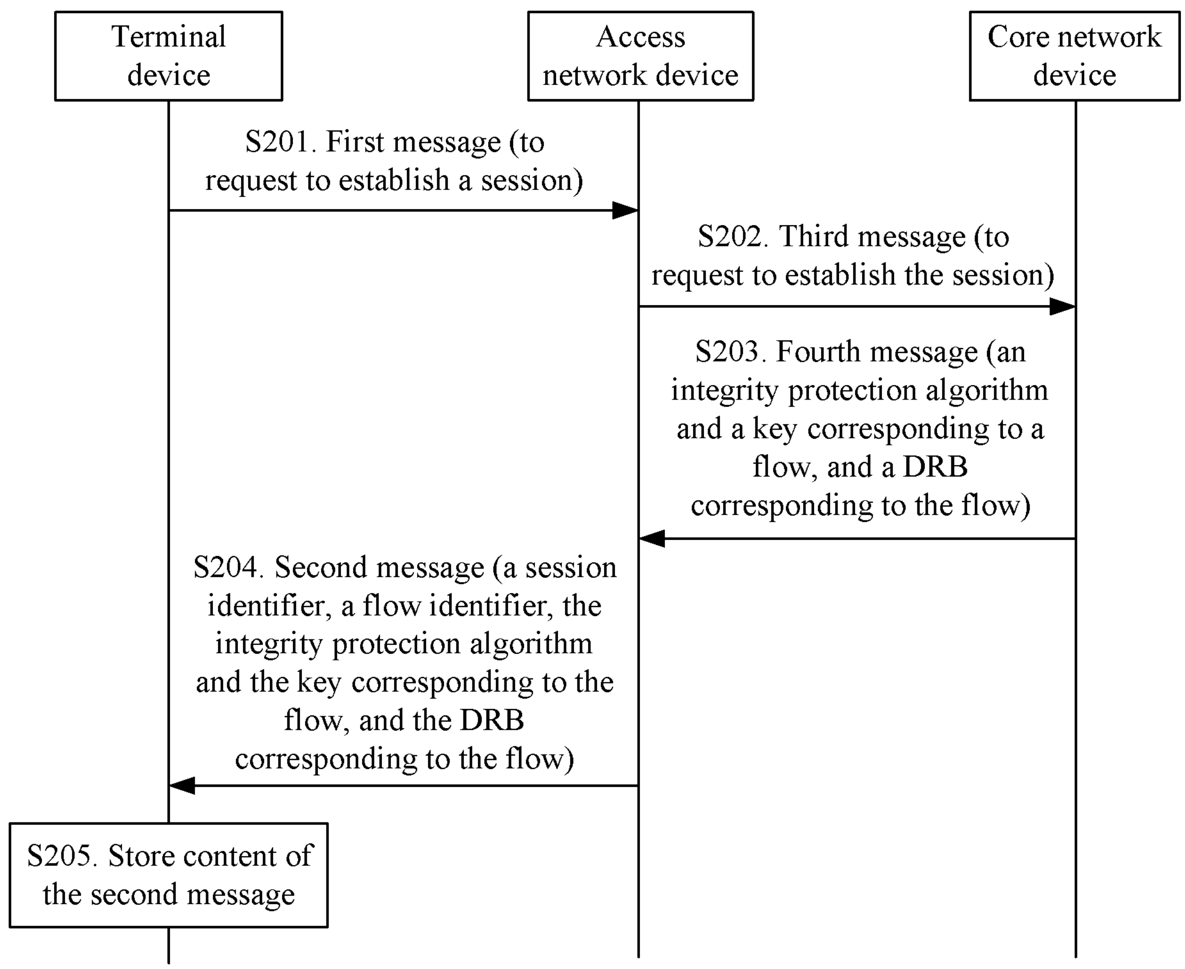
FIG. 4 is a signaling flowchart of a data integrity protection method according to Embodiment 2 of this application.

FIG. 4 is a signaling flowchart of a data integrity protection method according to Embodiment 2 of this application. Different from Embodiment 1, integrity protection in this embodiment is at a granularity of a flow. As shown in FIG. 4, the method in this embodiment mainly includes the following steps.

Step S201: A terminal device sends a first message to an access network device.

Step S202: The access network device sends a third message to a core network device, where the third message includes the first message.

For specific implementations of step S201 and step S202, refer to related descriptions in Embodiment 1.

Step S203: The core network device sends a fourth message to the access network device, where the fourth message includes an integrity protection algorithm and a key corresponding to a flow, and a DRB corresponding to the flow.

Different from Embodiment 1, in this embodiment, the fourth message includes the integrity protection algorithm and the key corresponding to the flow, and the DRB corresponding to the flow. The flow corresponds to a session that the first message is used to request to establish. One session includes a plurality of flows, and each flow may be mapped to a plurality of DRBs. In this embodiment, same or different integrity protection algorithms and keys can be used for a plurality of flows included in the session.

Optionally, the fourth message may not carry the integrity protection algorithm and the key corresponding to the flow, and the integrity protection algorithm and the key corresponding to the flow are carried by using another message, or the integrity protection algorithm and the key corresponding to the flow are configured in advance. Optionally, the fourth message may further include at least one of the following information: an indication of an integrity protection position, a position indication of an integrity protection protocol layer, an enabling indication of the integrity protection position, and an indication of an integrity protection object. Likewise, one or more of the indication of the integrity protection position, the position indication of the integrity protection protocol layer, the enabling indication of the integrity protection position, and the indication of the integrity protection object may be configured in advance, instead of being dynamically indicated by using the fourth message.

In this embodiment, an integrity protection configuration of the flow may be placed in a QoS flow resource information list in the fourth message, to indicate the integrity protection configuration corresponding to the flow, or may be placed separately in the fourth message, with a flow identifier corresponding to the integrity protection configuration added, for example, placed in a PDU session resource information list, so that the access network device learns of the integrity protection configuration of the flow from the fourth message. For a structure of the fourth message, refer to the foregoing Table 1. For the PDU session information list, refer to the foregoing Table 2. Table 4 is a schematic diagram of the QoS flow resource information list.

TABLE 4

| IE/Group Name | Presence | Range (Range) | IE type and reference | Semantics description | Criticality | Assigned Criticality |
|---|---|---|---|---|---|---|
| PDU Session Setup Request Transfer | | 1 | | | YES | reject |
| > PDU Session Resource Aggregated Maximum Bitrate | M (Mandatory) | | <ref> | | — | |
| >Transport Layer Information | M (Mandatory) | | <ref> | | — | |
| > PDU Session Type [FFS] | M (Mandatory) | | <ref> | eNote: IP, unstructured or Ethernet | — | |
| > QoS Flows Setup List | | 1 | | | — | |

TABLE 4-continued

| IE/Group Name | Presence | Range (Range) | IE type and reference | Semantics description | Criticality | Assigned Criticality |
|---|---|---|---|---|---|---|
| >> QoS Flows Setup Item IEs | | 1 . . . <maxnoofQoSFlows> | | | — | |
| >>> QoS Flow Indicator | M (Mandatory) | | <ref> | | EACH | reject |
| >>® QoS Flow Level QoS Parameters | FFS | | <ref> | | EACH | reject |
| >>> Optional position: integrity protection configuration | | | | | | |
| >>> Reflective QoS Activation [FFS] | O (Optional) | | <ref> | | EACH | reject |

In the example shown in Table 4, the integrity protection configuration corresponding to the flow is carried in the QoS flow resource information list. The QoS flow resource information list further includes an identifier corresponding to one or more flows, a QoS parameter of a QoS flow level, and the like.

Step S204: The access network device sends a second message to the terminal device, where the second message includes: an identifier of a session, an identifier of the flow, the integrity protection algorithm and the key corresponding to the flow, and an identifier of the DRB corresponding to the flow.

After receiving the fourth message, the access network device: stores the identifier of the session, the identifier of the flow, the integrity protection algorithm and the key corresponding to the flow, and the identifier of the DRB corresponding to the flow that are carried in the fourth message; establishes a DRB for the terminal device based on a configuration parameter of at least one protocol layer that is carried in the fourth message, to carry a service initiated by the terminal device; determines a DRB corresponding to each flow; generates the second message; and sends the second message to the terminal device. The second message may be a NAS message, an RRC message, a MAC layer message, or a physical layer message. When the second message is an RRC message: if the RRC message does not include a NAS message, then the identifier of the session, the identifier of the flow, the integrity protection algorithm and the key corresponding to the flow, and the identifier of the DRB corresponding to the flow are all carried in the RRC message; if the RRC message includes a NAS message, then all or some of the foregoing parameters are carried in the NAS message that is included in the RRC message.

In this embodiment, the second message includes the integrity protection algorithm and the key corresponding to the flow. Optionally, the second message may not carry the integrity protection algorithm and the key corresponding to the flow, and the integrity protection algorithm and the key corresponding to the flow are carried by using another message, or the integrity protection algorithm and the key corresponding to the flow are configured in advance. In another embodiment, the second message includes at least one of the following information: an integrity protection algorithm and a key, an indication of an integrity protection position, a position indication of an integrity protection protocol layer, an enabling indication of the integrity protection position, and an indication of an integrity protection object. Likewise, one or more of the indication of the integrity protection position, the position indication of the integrity protection protocol layer, the enabling indication of the integrity protection position, and the indication of the integrity protection object may be configured in advance, instead of being dynamically indicated by using the second message.

The integrity protection configuration corresponding to the flow carried in the second message may be the same as or different from the integrity protection configuration corresponding to the flow carried in the fourth message. For example, if the fourth message indicates a root key to be used for the flow, after receiving the fourth message, the access network device calculates, based on the indicated root key, a key to be used for the flow, and then adds the key to be used for the flow to the second message.

Optionally, the integrity protection configuration corresponding to the flow may be carried in an SDAP layer configuration parameter in the second message, that is, the integrity protection configuration corresponding to the flow is used as the SDAP layer configuration parameter. Alternatively, the integrity protection configuration corresponding to the flow may be carried in a PDCP layer configuration parameter, that is, the integrity protection configuration corresponding to the flow is used as the PDCP layer configuration parameter. The second message includes a configuration parameter of at least one protocol layer. Both the SDAP layer configuration parameter and the PDCP layer configuration parameter may be carried in the second message; or one of the configuration parameters is carried in the second message, and the other configuration message is carried in another message different from the second message.

Optionally, after step S204, the access network device sends a fifth message to the core network device. The fifth message is used to feed back a processing result of the fourth message sent by the core network device. If the access network device fails to configure a context of the terminal device, the fifth message is used to feed back a configuration failure and includes a failure cause indication, namely, a cause value. The fifth message is further used to carry an air interface resource allocated by the access network device for one or more sessions, and includes, for example, an established session information list of the access network device, and a list of QoS flows that cannot be established.

Step S205: The terminal device stores content of the second message.

The terminal device stores the integrity protection configuration corresponding to the flow carried in the second message, to subsequently perform, based on the stored integrity protection configuration corresponding to the flow, integrity protection on data of the DRB corresponding to the flow. The flow may correspond to one or more DRBs, and integrity protection algorithms and keys corresponding to different flows may be different.

Specifically, the terminal device performs, by using the integrity protection algorithm and the key corresponding to the flow, integrity protection on the data of the DRB corresponding to the flow. The data of the DRB is an SDAP layer data packet of the DRB, or a PDCP layer data packet of the DRB. In other words, the terminal device may perform, at an SDAP layer and a PDCP layer, integrity protection on the data of the DRB. SDAP layer data packets include a PDU and an SDU, and PDCP layer data packets also include a PDU and an SDU.

If integrity protection is performed at the PDCP layer, because the PDCP layer cannot differentiate flows and only the SDAP layer can identify a flow included in a session, the SDAP layer needs to mark the identifier of the flow in the SDAP layer data packet, so that the PDCP layer identifies different flows based on identifiers of flows, and further performs, based on the integrity protection algorithm and the key corresponding to the flow, integrity protection on data packets corresponding to the flow. The identifier of the flow may be placed in a header of the SDAP layer data packet, or may be placed in specific data content of the SDAP layer data packet. A specific format is not limited in this application.

In this embodiment, the terminal device obtains, by using the second message, the integrity protection algorithm and the key corresponding to the flow from the access network device. It should be noted that the terminal device may alternatively obtain, in another manner, the integrity protection algorithm and the key corresponding to the flow. For example, the integrity protection algorithm and the key corresponding to the flow are configured in advance on the terminal device, the second message needs to carry only the session identifier and the flow identifier, and the terminal device finds, based on the session identifier and the flow identifier, the integrity protection algorithm and the key corresponding to the flow. Likewise, other integrity protection configurations of the flow, for example, one or more of the indication of the integrity protection position, the position indication of the integrity protection protocol layer, the enabling indication of the integrity protection position, and the indication of the integrity protection object may be dynamically indicated by using the second message, or notified in a pre-configuration manner to the terminal device.

In this embodiment, the terminal device obtains the integrity protection algorithm and the key corresponding to the flow, and the DRB corresponding to the flow, and performs, by using the integrity protection algorithm and the key corresponding to the flow, integrity protection on the data of the DRB corresponding to the flow, so that different integrity protection algorithms and keys can be used for different flows, and integrity protection is more flexible and meets security requirements of a same user for different services.

Figure 5:
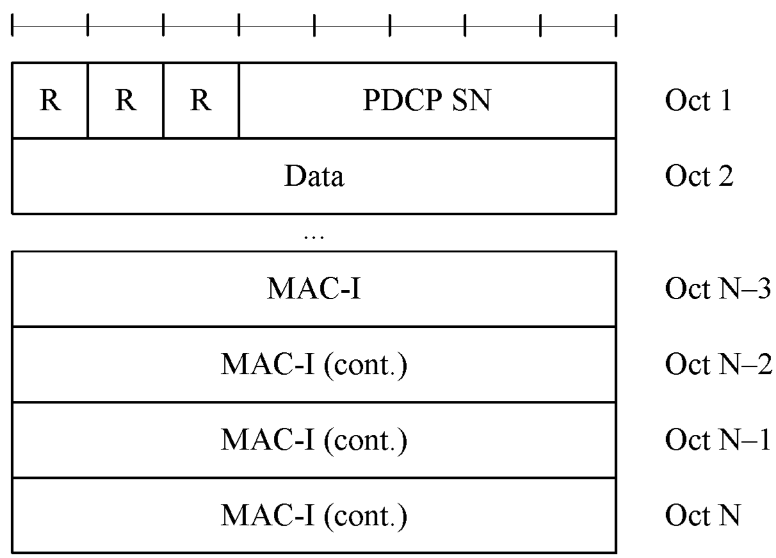
FIG. 5 is a schematic diagram of a MAC-I when integrity protection is performed at a PDCP layer.

In the foregoing embodiments, the transmit end may perform data integrity protection following any one of processes, such as sequence numbering, head compression, and encryption. Correspondingly, this is the same for the receive end. In addition, a position and a size of the MAC-I can be flexibly set. FIG. 5 is a schematic diagram of a MAC-I when integrity protection is performed at the PDCP layer. As shown in FIG. 5, the MAC-I may be carried in last several bytes of a message.

In the foregoing embodiments, the receive end performs an integrity check, and if an integrity check of a message fails, any one of the following several processing operations may be performed: (1) instructing the RRC to re-establish an RRC connection; (2) discarding the message; (3) discarding the message and re-establishing an RRC connection; and (4) re-establishing an RRC connection when a quantity of integrity check failures reaches a preset value.

The methods in the foregoing embodiments may be applied in a dual-connection (DC) scenario or a cell handover scenario. In the cell handover scenario, if the terminal device is handed over from a source base station to a target base station, the terminal device needs to send the integrity protection configuration corresponding to the session or the integrity protection configuration corresponding to the flow to the target base station, so that the target base station performs integrity protection based on the integrity protection configuration corresponding to the session or the integrity protection configuration corresponding to the flow. In the dual-connection (DC) scenario, integrity protection may be performed at only one node, or integrity protection may be performed at both nodes. A master node (MN) needs to send the integrity protection configuration corresponding to the session or the integrity protection configuration corresponding to the flow to a secondary node (SN), so that the secondary node can perform integrity protection based on the integrity protection configuration corresponding to the session or the integrity protection configuration corresponding to the flow.

Figure 6:
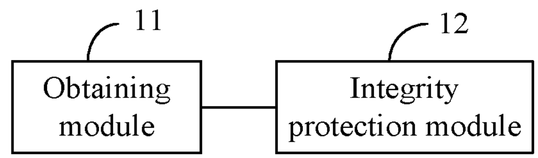
FIG. 6 is a schematic structural diagram of a terminal device according to Embodiment 3 of this application.

FIG. 6 is a schematic structural diagram of a terminal device according to Embodiment 3 of this application. As shown in FIG. 6, the terminal device provided in this embodiment includes: an obtaining module 11, configured to obtain an integrity protection algorithm and a key corresponding to a session, and a data radio bearer (DRB) corresponding to the session; and an integrity protection module 12, configured to perform integrity protection on data of the DRB by using the integrity protection algorithm and the key.

Optionally, the obtaining module 11 is specifically configured to: send a first message, where the first message is used to request to establish the session; and receive a second message, where the second message includes: an identifier of the session, the integrity protection algorithm and the key corresponding to the session, and an identifier of the DRB corresponding to the session.

Optionally, the second message includes an SDAP layer configuration, and the SDAP layer configuration includes the identifier of the session, the integrity protection algorithm and the key corresponding to the session, and the identifier of the DRB corresponding to the session; or the second message includes a PDCP layer configuration, and the PDCP layer configuration includes the identifier of the session, the integrity protection algorithm and the key corresponding to the session, and the identifier of the DRB corresponding to the session.

Optionally, the obtaining module 11 is further configured to obtain at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, the data of the DRB is an SDAP layer data packet of the DRB, or a PDCP layer data packet of the DRB. When the data of the DRB is an SDAP layer data packet of the DRB, the terminal device further includes: a marking module, configured to mark the identifier of the flow in the SDAP layer data packet of the DRB.

The terminal device provided in this embodiment may be configured to perform the steps that are performed by the terminal device in Embodiment 1, and a specific implementation and a technical effect are similar thereto. Details are not described herein again.

Embodiment 4 of this application provides a terminal device. For a structure of the terminal device, refer to FIG. 6. In this embodiment, an obtaining module 11 is configured to obtain an integrity protection algorithm and a key corresponding to a flow, and a data radio bearer (DRB) corresponding to the flow; and an integrity protection module 12 is configured to perform integrity protection on data of the DRB by using the integrity protection algorithm and the key.

Optionally, the obtaining module 11 is specifically configured to: send a first message, where the first message is used to request to establish a session, and the session corresponds to the flow; and receive a second message, where the second message includes: an identifier of the session, an identifier of the flow, an identifier of the DRB corresponding to the flow, and the integrity protection algorithm and the key corresponding to the flow.

Optionally, the second message includes an SDAP layer configuration, and the SDAP layer configuration includes the identifier of the session, the identifier of the flow, the identifier of the DRB corresponding to the flow, and the integrity protection algorithm and the key corresponding to the flow; or the second message includes a PDCP layer configuration, and the PDCP layer configuration includes the identifier of the session, the identifier of the flow, the identifier of the DRB corresponding to the flow, and the integrity protection algorithm and the key corresponding to the flow.

Optionally, the obtaining module 11 is further configured to obtain at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, the data of the DRB is an SDAP layer data packet of the DRB, or a PDCP layer data packet of the DRB. When the data of the DRB is an SDAP layer data packet of the DRB, the terminal device further includes: a marking module, configured to mark the identifier of the flow in the SDAP layer data packet of the DRB.

The terminal device provided in this embodiment may be configured to perform the steps that are performed by the terminal device in Embodiment 2, and a specific implementation and a technical effect are similar thereto. Details are not described herein again.

Figure 7:
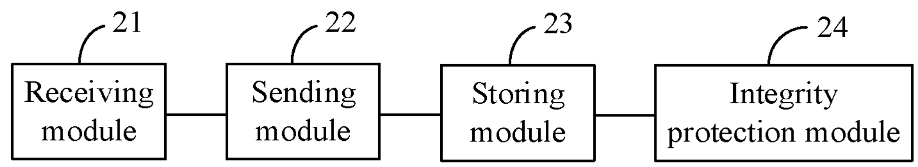
FIG. 7 is a schematic structural diagram of an access network device according to Embodiment 5 of this application.

FIG. 7 is a schematic structural diagram of an access network device according to Embodiment 5 of this application. As shown in FIG. 7, the access network device provided in this embodiment includes: a receiving module 21, configured to receive a first message sent by a terminal device, where the first message is used to request to establish a session; a sending module 22, configured to send a third message to a core network device, where the third message includes the first message, where the receiving module 21 is further configured to receive a fourth message sent by the core network device, where the fourth message includes an integrity protection algorithm and a key corresponding to the session, and a data radio bearer (DRB) corresponding to the session; and a storing module 23, configured to store the integrity protection algorithm and the key corresponding to the session, and the DRB corresponding to the session, where the sending module 22 is further configured to send a second message to the terminal device, where the second message includes: an identifier of the session, the integrity protection algorithm and the key corresponding to the session, and an identifier of the DRB corresponding to the session.

Optionally, the second message includes an SDAP layer configuration, and the SDAP layer configuration includes the identifier of the session, the integrity protection algorithm and the key corresponding to the session, and the identifier of the DRB corresponding to the session; or the second message includes a PDCP layer configuration, and the PDCP layer configuration includes the identifier of the session, the integrity protection algorithm and the key corresponding to the session, and the identifier of the DRB corresponding to the session.

Optionally, the third message or the second message further includes at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, the access network device further includes: an integrity protection module 24, configured to perform integrity protection on data of the DRB by using the integrity protection algorithm and the key.

Optionally, the data of the DRB is an SDAP layer data packet of the DRB, or a PDCP layer data packet of the DRB.

When the data of the DRB is an SDAP layer data packet of the DRB, the access network device further includes: a marking module, configured to mark the identifier of the flow in the SDAP layer data packet of the DRB.

Embodiment 6 of this application provides an access network device. For a structure of the access network device, refer to FIG. 7. In this embodiment:

A receiving module 21 is configured to receive a first message sent by a terminal device, where the first message is used to request to establish a session.

A sending module 22 is configured to send a third message to a core network device, where the third message includes the first message.

The receiving module 21 is further configured to receive a fourth message sent by the core network device, where the fourth message includes an integrity protection algorithm and a key corresponding to a flow, and a data radio bearer (DRB) corresponding to the flow, and the session corresponds to the flow.

A storing module 23 is configured to store the integrity protection algorithm and the key corresponding to the flow, and the DRB corresponding to the flow.

The sending module 22 is further configured to send a second message to the terminal device, where the second message includes: an identifier of the session, an identifier of the flow, an identifier of the DRB corresponding to the flow, and the integrity protection algorithm and the key corresponding to the flow.

Optionally, the second message includes an SDAP layer configuration, and the SDAP layer configuration includes the identifier of the session, the identifier of the flow, the identifier of the DRB corresponding to the flow, and the integrity protection algorithm and the key corresponding to the flow; or the second message includes a PDCP layer configuration, and the PDCP layer configuration includes the identifier of the session, the identifier of the flow, the identifier of the DRB corresponding to the flow, and the integrity protection algorithm and the key corresponding to the flow.

Optionally, the third message or the second message further includes at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, an integrity protection module 24 is configured to perform integrity protection on data of the DRB by using the integrity protection algorithm and the key.

Optionally, the data of the DRB is an SDAP layer data packet of the DRB, or a PDCP layer data packet of the DRB.

When the data of the DRB is an SDAP layer data packet of the DRB, the access network device further includes: a marking module, configured to mark the identifier of the flow in the SDAP layer data packet of the DRB.

Figure 8:
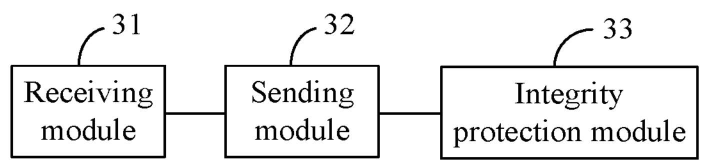
FIG. 8 is a schematic structural diagram of a core network device according to Embodiment 7 of this application.

FIG. 8 is a schematic structural diagram of a core network device according to Embodiment 7 of this application. As shown in FIG. 8, the core network device provided in this embodiment includes: a receiving module 31, configured to receive a third message sent by an access network device, where the third message includes a first message, and the first message is used to request to establish a session; and a sending module 32, configured to send a fourth message to the access network device, where the fourth message includes an integrity protection algorithm and a key corresponding to the session, and a data radio bearer (DRB) corresponding to the session; or includes an integrity protection algorithm and a key corresponding to a flow, and a DRB corresponding to the flow, where the session corresponds to the flow.

Optionally, the fourth message further includes at least one of the following information: an indication of an integrity protection position, a position indication of an integrity protection protocol layer, an enabling indication of the integrity protection position, and an indication of an integrity protection object, where the indication of the integrity protection position is used to indicate a network element where integrity protection is performed; the position indication of the integrity protection protocol layer is used to indicate a protocol layer where integrity protection is performed; the enabling indication of the integrity protection position is used to indicate whether to enable an integrity protection function or not; and the indication of the integrity protection object is used to indicate that an object for integrity protection is user plane data, or user plane data and control plane signaling.

Optionally, the core network device further includes: an integrity protection module 33, configured to perform integrity protection on data of the DRB by using the integrity protection algorithm and the key.

Optionally, the data of the DRB is an SDAP layer data packet of the DRB, or a PDCP layer data packet of the DRB.

When the data of the DRB is an SDAP layer data packet of the DRB, the core network device further includes: a marking module, configured to mark the identifier of the flow in the SDAP layer data packet of the DRB.

It should be noted that in the foregoing apparatus embodiments, the receiving module and the sending module may be implemented by using a transceiver, or the receiving module is implemented by an independent receiver and the sending module is implemented by an independent transmitter. The obtaining module, the integrity protection module, and the marking module in the foregoing embodiments may be implemented by a processor having a data processing function.

Figure 9:
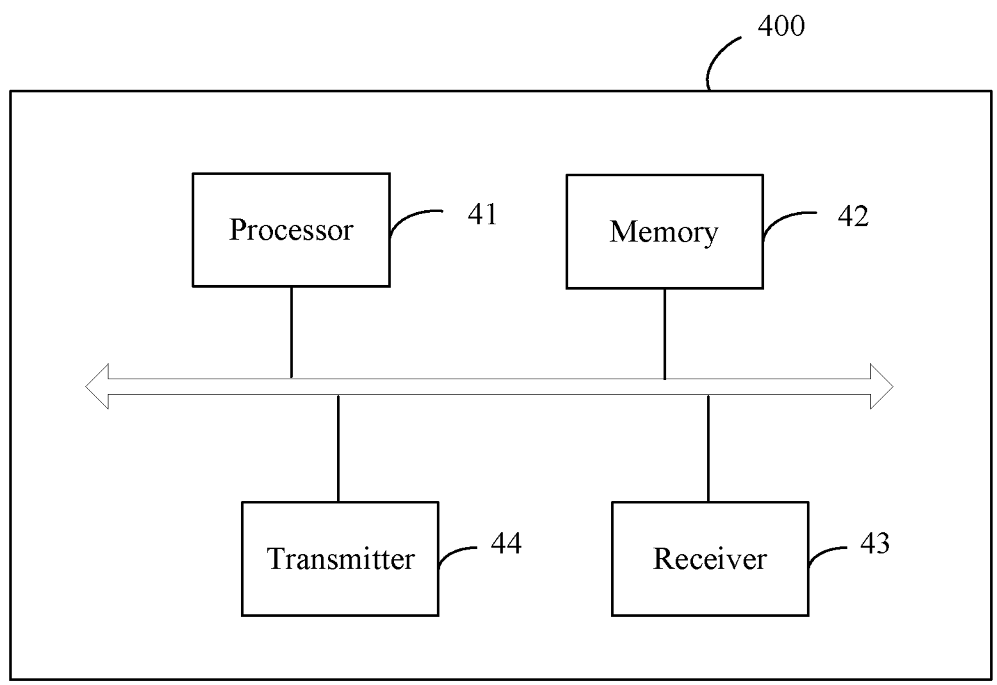
FIG. 9 is a schematic structural diagram of a terminal device according to Embodiment 8 of this application.

FIG. 9 is a schematic structural diagram of a terminal device according to Embodiment 8 of this application. As shown in FIG. 9, the terminal device 400 in this embodiment includes: a processor 41, a memory 42, a receiver 43, and a transmitter 44, where the memory 42, the receiver 43, and the transmitter 44 are connected to and communicate with the processor 41 by using a bus, the memory 42 is configured to store a computer executable instruction, and the processor 41 is configured to execute the computer executable instruction, so that the terminal device 400 performs the steps that are performed by the terminal device in the methods provided in Embodiment 1 and Embodiment 2. A specific implementation and a technical effect are similar thereto. Details are not described herein again.

Figure 10:
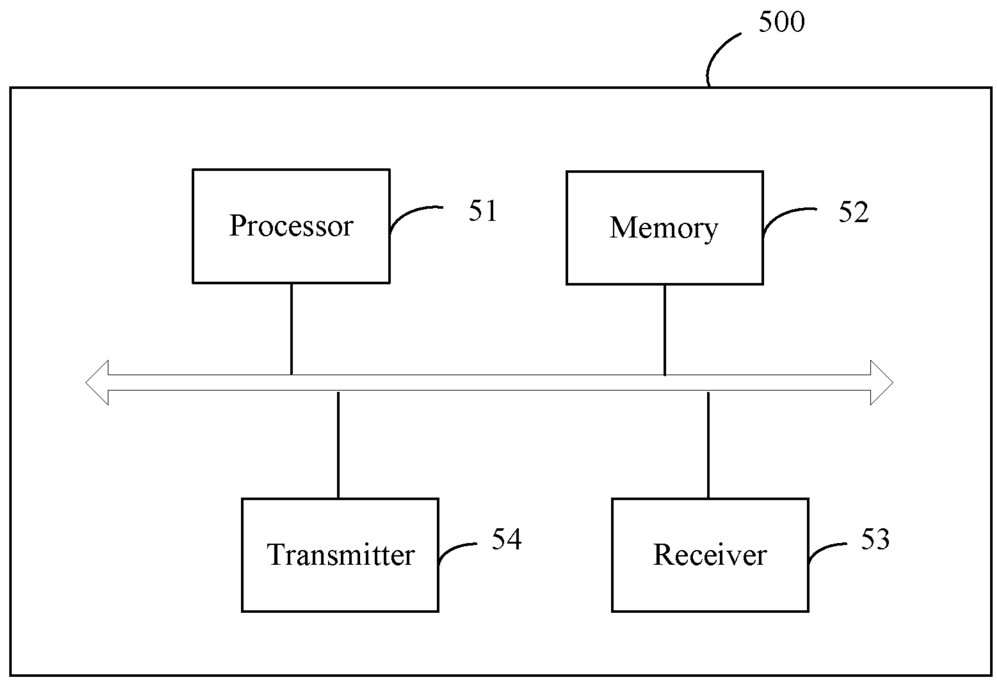
FIG. 10 is a schematic structural diagram of an access network device according to Embodiment 9 of this application.

FIG. 10 is a schematic structural diagram of an access network device according to Embodiment 9 of this application. As shown in FIG. 10, the access network device 500 in this embodiment includes: a processor 51, a memory 52, a receiver 53, and a transmitter 54, where the memory 52, the receiver 53, and the transmitter 54 are connected to and communicate with the processor 51 by using a bus, the memory 52 is configured to store a computer executable instruction, and the processor 51 is configured to execute the computer executable instruction, so that the access network device 500 performs the steps that are performed by the access network device in the methods provided in Embodiment 1 and Embodiment 2. A specific implementation and a technical effect are similar thereto. Details are not described herein again.

Figure 11:
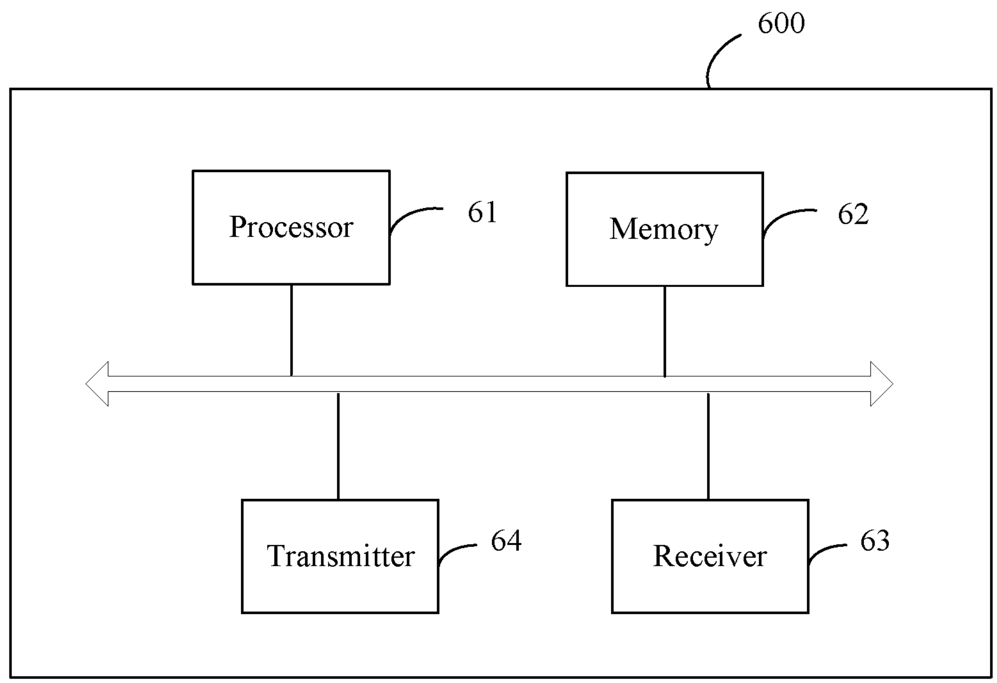
FIG. 11 is a schematic structural diagram of a core network device according to Embodiment 10 of this application.

FIG. 11 is a schematic structural diagram of a core network device according to Embodiment 10 of this application. As shown in FIG. 11, the core network device 600 in this embodiment includes: a processor 61, a memory 62, a receiver 63, and a transmitter 64, where the memory 62, the receiver 63, and the transmitter 64 are connected to and communicate with the processor 61 by using a bus, the memory 62 is configured to store a computer executable instruction, and the processor 61 is configured to execute the computer executable instruction, so that the core network device 600 performs the steps that are performed by the core network device in the methods provided in Embodiment 1 and Embodiment 2. A specific implementation and a technical effect are similar thereto. Details are not described herein again.

Embodiment 11 of this application provides a computer readable medium, where the computer readable medium includes a computer executable instruction, and the computer executable instruction is used to enable a terminal device to perform the steps of the methods that are performed by the terminal device in Embodiment 1 and Embodiment 2 of this application.

Embodiment 12 of this application provides a computer readable medium, where the computer readable medium includes a computer executable instruction, and the computer executable instruction is used to enable an access network device to perform the steps of the methods that are performed by the access network device in Embodiment 1 and Embodiment 2 of this application.

Embodiment 13 of this application provides a computer readable medium, where the computer readable medium includes a computer executable instruction, and the computer executable instruction is used to enable a core network device to perform the steps of the methods that are performed by the core network device in Embodiment 1 and Embodiment 2 of this application.

Embodiment 14 of this application provides an on-chip system. The system may be applied to a terminal device, and the on-chip system includes: at least one communications interface, at least one processor, and at least one memory, where the communications interface, the memory, and the processor are interconnected by using a bus, and the processor invokes an instruction stored in the memory, to perform the steps of the methods that are performed by the terminal device in Embodiment 1 and Embodiment 2 of this application.

Embodiment 15 of this application provides an on-chip system. The system may be applied to an access network device, and the on-chip system includes: at least one communications interface, at least one processor, and at least one memory, where the communications interface, the memory, and the processor are interconnected by using a bus, and the processor invokes an instruction stored in the memory, to perform the steps of the methods that are performed by the access network device in Embodiment 1 and Embodiment 2 of this application.

Embodiment 16 of this application provides an on-chip system. The system may be applied to a core network device, and the on-chip system includes: at least one communications interface, at least one processor, and at least one memory, where the communications interface, the memory, and the processor are interconnected by using a bus, and the processor invokes an instruction stored in the memory, to perform the methods that are performed by the core network device in Embodiment 1 and Embodiment 2 of this application.

Embodiment 17 of this application provides a program product, where the program product includes a computer program, the computer program is stored in a readable storage medium, and at least one processor of a terminal device executes the computer program, so that the terminal device implements the steps of the methods that are performed by the terminal device in Embodiment 1 and Embodiment 2 of this application.

Embodiment 18 of this application provides a program product, where the program product includes a computer program, the computer program is stored in a readable storage medium, and at least one processor of an access network device executes the computer program, so that the access network device implements the steps of the methods that are performed by the access network device in Embodiment 1 and Embodiment 2 of this application.

Embodiment 19 of this application provides a program product, where the program product includes a computer program, the computer program is stored in a readable storage medium, and at least one processor of a core network device executes the computer program, so that the core network device implements the steps of the methods that are performed by the core network device in Embodiment 1 and Embodiment 2 of this application.

It may be understood that the processor in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute the illustrative logical blocks, modules, and circuits described in this application. Alternatively, the processor may be a combination of processors implementing a computing function, for example, a combination of one or more microprocessors, or a combination of a DSP and a microprocessor.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of expression, the bus in the accompanying drawings of this application is not limited to only one bus or one type of bus.

In the several embodiments provided in this application, the described apparatus embodiments are merely examples. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electrical, mechanical, or other forms.

The units described as separate parts may or may not be physically separate, that is, may be located in one position, or may be distributed on a plurality of network units. Some or all of the units may be selected based on actual requirements to achieve the objectives of the solutions of the embodiments.

What is claimed is:

1. A data integrity protection method carried out by a terminal device, the method comprising:

sending a first message to an access network device, wherein the first message is a request to establish a session;

receiving a second message from the access network device, wherein the second message comprises:

an identifier of the session, and an identifier of a first data radio bearer (DRB) corresponding to the session; and performing an integrity protection on a data of the first DRB by using a first integrity protection algorithm corresponding to the session and a first key corresponding to the session, wherein the data is a user plane data of an air interface between the access network device and the terminal device, wherein the session corresponds to a plurality of DRBs including the first DRB, wherein the first integrity protection algorithm and the first key are used for each one of the plurality of DRBs corresponding to the session, and wherein the second message comprises a first protocol layer configuration, wherein the first protocol layer configuration comprises the identifier of the session, and wherein the first protocol layer processes a mapping from a flow to a DRB of the plurality of DRBs including the first DRB.

2. The method according to claim 1, wherein the second message further comprises:

a first indication, wherein the first indication indicates, to the terminal device, whether to enable an integrity protection function or not.

3. The method according to claim 2, wherein the second message comprises a Packet Data Convergence Protocol (PDCP) layer configuration, and wherein the PDCP layer configuration comprises the first indication.

4. The method according to claim 1, wherein the second message further comprises:

a second indication, wherein the second indication indicates, to the terminal device, a protocol layer where the integrity protection is performed.

5. The method according to claim 1, wherein the data of the DRB is a PDCP layer data packet.

6. An apparatus, comprising at least one processor and a memory coupled to the at least one processor, the at least one processor being configured to:

send a first message to an access network device, wherein the first message is a request to establish a session;

receive a second message from the access network device, wherein the second message comprises an identifier of the session, an identifier of a first data radio bearer (DRB) corresponding to the session; and perform an integrity protection on a data of the first DRB by using a first integrity protection algorithm corresponding to the session and a first key corresponding to the session, wherein the data is a user plane data of an air interface between the access network device and the terminal device, wherein the session corresponds to a plurality of DRBs including the first DRB, wherein the first integrity protection algorithm and the first key are used for each one of the plurality of DRBs corresponding to the session, and wherein the second message comprises a first protocol layer configuration, wherein the first protocol layer configuration comprises the identifier of the session, and wherein the first protocol layer processes a mapping from a flow to a DRB of the plurality of DRBs including the first DRB.

7. The apparatus according to claim 6, wherein the second message further comprises:

a first indication, wherein the first indication indicates whether to enable an integrity protection function or not.

8. The apparatus according to claim 7, wherein the second message comprises a Packet Data Convergence Protocol (PDCP) layer configuration, and wherein the PDCP layer configuration comprises the first indication.

9. The apparatus according to claim 6, wherein the second message further comprises:

a second indication, wherein the second indication is used to indicate a protocol layer where the integrity protection is performed.

10. The apparatus according to claim 6, wherein the data of the DRB is a PDCP layer data packet.

11. An apparatus comprising a transceiver and a processor, wherein:

the transceiver is configured to send a first message to an access network device, wherein the first message is a request to establish a session;

the transceiver is further configured to receive a second message from the access network device, wherein the second message comprises an identifier of the session, an identifier of a first data radio bearer (DRB) corresponding to the session; and the processor is configured to perform an integrity protection on a data of the first DRB by using a first integrity protection algorithm corresponding to the session and a first key corresponding to the session, wherein the data is a user plane data of an air interface between the access network device and the terminal device, wherein the session corresponds to a plurality of DRBs including the first DRB, wherein the first integrity protection algorithm and the first key are used for each one of the plurality of DRBs corresponding to the session, and wherein the second message comprises a first protocol layer configuration, wherein the first protocol layer configuration comprises the identifier of the session, and wherein the first protocol layer processes a mapping from a flow to a DRB of the plurality of DRBs including the first DRB.

12. The apparatus according to claim 11, wherein the second message further comprises:

a first indication, wherein the first indication indicates whether to enable an integrity protection function or not.

13. The apparatus according to claim 12, wherein the second message comprises a Packet Data Convergence Protocol (PDCP) layer configuration, and the PDCP layer configuration comprises the first indication.

14. The apparatus according to claim 11, wherein the second message further comprises:

a second indication, wherein the second indication indicates a protocol layer where the integrity protection is performed.

15. The apparatus according to claim 11, wherein the data of the DRB is a PDCP layer data packet.

16. A non-transitory computer-readable storage medium, comprising a program, wherein when being executed by a processor, the following steps are performed:

sending a first message to an access network device, wherein the first message is used to request to establish a session;

receiving a second message from the access network device, wherein the second message comprises an identifier of the session, an identifier of a first data radio bearer (DRB) corresponding to the session; and performing an integrity protection on a data of the first DRB by using a first integrity protection algorithm corresponding to the session and a first key corresponding to the session, wherein the data is a user plane data of an air interface between the access network device and the terminal device, wherein the session corresponds to a plurality of DRBs including the first DRB, wherein the first integrity protection algorithm and the first key are used for the plurality of DRBs corresponding to the session, and wherein the second message comprises a first protocol layer configuration, wherein the first protocol layer configuration comprises the identifier of the session, and wherein the first protocol layer processes a mapping from a flow to a DRB of the plurality of DRBs including the first DRB.

17. The method according to claim 1, wherein the second message comprises integrity protection algorithm and the key corresponding to the session; or the integrity protection algorithm and the key corresponding to the session are configured in advance in the terminal device.

18. The apparatus according to claim 6, wherein the second message comprises integrity protection algorithm and the key corresponding to the session; or the integrity protection algorithm and the key corresponding to the session are configured in advance in the terminal device.

19. The apparatus according to claim 11, wherein the second message comprises integrity protection algorithm and the key corresponding to the session; or the integrity protection algorithm and the key corresponding to the session are configured in advance in the terminal device.

* * * * *